3,275,673
EXTRACTION METHOD FOR RECOVERING AMINE OXIDE SALTS FROM AQUEOUS SOLUTIONS
David O. Barlow, Wilmington, Del., assignor to E. I. du Pont de Nemours and Company, Wilmington, Del., a corporation of Delaware
No Drawing. Filed May 15, 1963, Ser. No. 280,709
5 Claims. (Cl. 260—459)

This invention relates to the recovery of amine oxides from solutions, particularly their recovery in special salt forms.

The amine oxides of tertiary amines of the formula

in which each of $R^1$ and $R^2$ is methyl or ethyl and $R^3$ is an alkyl radical having from 8 to 20 carbon atoms, are useful for many purposes and particularly as detergents and surface active agents. They can best be prepared by reacting the amine with hydrogen peroxide to yield 30 to 40% aqueous solutions of the amine oxide. For shipping economy and for use in detergent formulations, essentially dry amine oxide products are desirable. However, recovery of these amine oxides by evaporating such solutions to dryness is not practical since pasty hydrates are formed. Furthermore, the amine oxides are too unstable at elevated temperatures to permit their recovery by spray drying techniques and recovery by extraction with organic solvents yields unworkable gels or mixtures.

It is an object of the invention to provide a practical method of recovering amine oxides of the above type in essentially dry form from aqueous solutions thereof. A further object is to provide a method for their recovery in the form of essentially dry salts of sulfonic acids or salts of fatty alcohol half-esters of sulfuric acid. Other objects of the invention will be apparent from the following description.

The objects of the invention are accomplished by forming an aqueous solution of a salt of an amine oxide of the above type and an acid which is either an organic sulfonic acid or a fatty alcohol half-ester of sulfuric acid, and extracting the resulting salt from the solution with a water-immiscible organic solvent. Removal of the organic solvent from the resulting extract yields the dry and anhydrous amine oxide salt. Formation of the aqueous solution of the amine oxide salt which is to be extracted is readily accomplished by reacting an aqueous solution of the amine oxide with an amount of the acid which is approximately stoichiometrically equivalent to the amine oxide present in the solution.

The starting amine oxide solution can be obtained in any desired manner and may be diluted or concentrated. However, the use of concentrated solutions is obviously advantageous and the use of those containing 30 to 40% of the amine oxide by weight obtained directly by the reaction of the parent tertiary amine with hydrogen peroxide is preferred. Such concentrated amine oxide solutions can be readily obtained by the method of the pending application of Chadwick, Serial No. 250,018, filed January 8, 1963, now Patent No. 3,215,741. That method involves reacting the tertiary amine under agitation at 40 to 80° C. with aqueous hydrogen peroxide containing at least 20% $H_2O_2$ by weight until substantially complete conversion of the amine to the amine oxide is realized and, during the course of the reaction, diluting the reaction mixture with only such an amount of water as is required to permit effective agitation of the reaction mixture.

The acid whose salt is formed by reaction with the amine oxide solution may be either an organic sulfonic acid or a fatty alcohol half-ester of sulfuric acid. The suitable organic sulfonic acids include the aromatic sulfonic acids having a sulfonic acid group attached directly to an aromatic nucleus such as a benzene or naphthalene ring. The aromatic nucleus may contain one or more alkyl substituent groups of from 1 to 20 carbon atoms each. Examples of such compounds are benzene and naphthalene sulfonic acids, the toluene and xylene sulfonic acids, dodecylbenzene sulfonic acid and pentadecylbenzene sulfonic acid. Also suitable are the aliphatic sulfonic acids having from 10 to 20 carbon atoms, examples of which are: dodecane sulfonic acid and hexadecane sulfonic acid. The fatty alcohol half-esters of sulfuric acid which are useful for the purpose of the invention are those derived from fatty alcohols having from 10 to 20 carbon atoms. Examples are the half-esters of decyl alcohol, dodecyl alcohol, pentadecyl alcohol, hexadecyl alcohol, octadecyl alcohol and mixed alcohols of this type such as coconut fatty alcohol.

Any water-immiscible organic liquid which is chemically inert towards the amine oxide salt under the conditions of use and which is a solvent therefor may be employed as the solvent for extracting the amine oxide salt from its aqueous solution. Preferably, the solvent will be one having a relatively low boiling point, e.g., an atmospheric boiling point not higher than 100° C., so that separation of the salt from the extract solution can be accomplished simply by evaporation of the solvent. The suitable solvents are polar compounds such as the water-immiscible polar, partially chlorinated aliphatic hydrocarbons, esters and ethers. Specific examples are methylene chloride and chloroform; methyl acetate, ethyl acetate, isopropyl acetate, methyl propionate and ethyl propionate; diethyl ether, dipropyl ether, ethyl propyl ether, ethyl butyl ether, and methyl butyl ether. Of such solvents, the chlorinated hydrocarbons are preferred. Methylene chloride is particularly preferred because of its excellent solvent properties, and its low boiling point which facilitates its complete removal by evaporation from the amine oxide salt product.

Extraction of the amine oxide salt from water solutions thereof by means of solvents of the above type can be carried out employing well-known extraction techniques. The extraction may be carried out batchwise or continuously employing either co-current or counter-current methods. Temperature is not a critical factor and temperatures of from 0 to 50° C. are generally satisfactory. Temperatures of about room temperature will usually be used. The organic solvent can be separated from the resulting extract phase by simple evaporation or distillation methods to leave the dry and anhydrous amine oxide salt product. Ordinarily, it will be advantageous to recover the vaporized solvent, e.g., by condensation, for reuse.

The invention is illustrated by the following examples in which all composition percentages are by weight.

*Example 1.*—A commercial mixture of alkyldimethylamines having an average molecular weight of 240.7 and containing about 0.3% dimethyldecylamine, 39.6% dimethyldodecylamine, 57.5% of dimethyltetradecylamine and 0.5% dimethylhexadecylamine, was reacted with hydrogen peroxide by the method of the above Chadwick application to yield an aqueous solution containing 31.5% amine oxide and 1.1% unreacted amine.

To 200 g. (0.25 mole amine oxide) of the above solution, there was added with stirring a slurry of 48.5 g. (0.25 mole) of p-toluenesulfonic acid monohydrate in 250 ml. of methylene chloride. After stirring for 15 minutes, the mixture was transferred to a separatory funnel and the phases separated. Most of the methylene chloride was evaporated from the organic phase at room temperature to leave a paste from which residual methylene chloride was then removed under vacuum.

The solid product weighed 107.6 g. The completeness of the extraction was demonstrated by the fact that extraction of the aqueous phase with another 100 ml. portion of methylene chloride followed by evaporation of the organic phase to remove methylene chloride yielded only 0.1 g. more of the product. Total recovery of the amine oxide sulfonic acid salt product was 97.9% of theory. Product analysis was as follows:

|  | Percent by Weight | |
| --- | --- | --- |
|  | Calculated from Starting Materials | Found by Analysis |
| Amine Oxide | 57.8 | 58.8 |
| Amine | 2.0 | 1.2 |
| p-Toluene sulfonic acid | 40.2 | 40.0 |

*Example 2.*—To 200 g. (0.25 mole) of the amine oxide solution of Example 1, there were added with stirring 56.6 g. (0.25 mole) of 2,5-dimethylbenzenesulfonic acid and 250 ml. of methylene chloride. After stirring for 4 minuates, the mixture was transferred to a separatory funnel and the two phases separated. The aqueous phase was extracted with an additional 100 ml. of methylene chloride and the extracts combined. The combined extracts were freed of methylene chloride as described in Example 1, leaving an amorphous solid product as residue. The latter weighed 110.9 g., which represented a yield of 98.5% of theory. The calculated composition of this amine oxide salt of the sulfonic acid, based upon the materials used, was: 42.1% 2,5-dimethylbenzenesulfonic acid, 56% amine oxide and 1.9% amine. The composition found by analysis was 42.4% 2,5-dimethylbenzenesulfonic acid, 57.4% amine oxide and 1.1% amine.

*Example 3.*—To 140 g. (0.5 mole) of a coconut alcohol half-ester of sulfuric acid there were added with agitation 400 g. (0.5 mole) of the amine oxide solution of Example 1 and 100 ml. of distilled water to facilitate agitation. Following thorough mixing, 200 g. of the mixture was removed and extracted with 600 ml. of methylene chloride. After separating the organic extract phase, the aqueous phase was extracted further with an additional 100 ml. of methylene chloride. Methylene chloride was removed from the combined extract phase as in the preceding examples. The dried solid residual amine oxide salt of the starting half-ester weighed 79 g., representing a 99.6% recovery of the solids present in the reaction mixture. The calculated composition of the product based upon the materials used was 40.2% of the half-ester, 57.8% amine oxide and 2.0% amine. The composition found by analysis was 43.3% of the half-ester, 56.6% amine oxide and 2.7% amine.

*Example 4.*—To 200 g. (0.25 mole) of the amine oxide solution of Example 1, there were added with stirring 74.8 g. (0.25 mole) of a commercial dodecylbenzenesulfonic acid having an Acid Number of 191 and 600 ml. of methylene chloride. Stirring was continued until the mixture was generally uniform. Upon cessation of stirring, two phases separated and the aqueous phase was extracted further with two ml. portions of methylene chloride. The combined organic extract phase was filtered through a ¼" layer of anhydrous sodium sulfate in a straight-walled funnel 2" in diameter, and the sodium sulfate was washed with two 50 ml. portions of methylene chloride. The combined extracts and washings were freed of methylene chloride as in the previous examples to leave a viscous yellow liquid amine oxide salt of the sulfonic acid. The yield of product was 142.8 g. or 102% of the theoretical amount. Its theoretical composition based upon the materials used was 53.4% of the sulfonic acid, 45.0% amine oxide and 1.5% amine. Its composition found by analysis was 51.7% of the sulfonic acid, 44.0% amine oxide and 1.8% amine.

The amine oxide salt products obtained by the method of the invention are anhydrous. Their amine oxide and acid moieties are both useful, particularly in detergent compositions. These amine oxides themselves are valuable surface active agents as are also the water-soluble salts of the foregoing sulfonic acids and alcohol half-esters of sulfuric acid. Thus, the amine oxide salt products of the present method can be employed in detergent compositions as sources of two different types of surface active agents.

The embodiments of the invention in which an exclusive property or privilege is claimed are as follows:

1. The method of recovering an amine oxide in the form of a salt thereof from an aqueous solution of said amine oxide, which amine oxide is the oxide of a tertiary amine of the formula

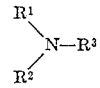

wherein each of $R^1$ and $R^2$ is from the group consisting of methyl and ethyl radicals and $R_3$ is an alkyl radical having from 8 to 20 carbon atoms, said method comprising reacting an aqueous solution of said amine oxide with an acid to form an aqueous solution of a salt of said amine oxide and said acid, extracting said salt from the latter solution with a water-immiscible, polar organic solvent which is a solvent for said salt and is inert thereto and has an atmospheric boiling point not higher than 100° C., then removing said solvent from the resulting extract; said acid being from the group consisting of (a) the aromatic and alkylsubstituted aromatic sulfonic acids in which the alkyl substituent groups contain from 1 to 20 carbon atoms, (b) the aliphatic sulfonic acids containing from 10 to 20 carbon atoms, and (c) the fatty alcohol half-esters of sulfuric acid containing from 10 to 20 carbon atoms; and said organic solvent being from the group consisting of methylene chloride, chloroform, methyl acetate, ethyl acetate, isopropyl acetate, methyl propionate, ethyl propionate, diethyl ether, dipropyl ether, ethyl propyl ether, ethyl butyl ether and methyl butyl ether.

2. The method of claim 1 wherein the acid is a sulfonic acid.

3. The method of claim 1 wherein the acid is an alkyl substituted benzene sulfonic acid.

4. The method of claim 1 wherein the acid is a fatty alcohol half-ester of sulfuric acid.

5. The method of claim 1 wherein the solvent is methylene chloride.

References Cited by the Examiner

UNITED STATES PATENTS 2,169,976 8/1939 Guenther et al. _____ 260—583
3,047,579 7/1962 Witman _____ 260—583

CHARLES B. PARKER, *Primary Examiner.*

ANTON H. SUTTO, *Assistant Examiner.*